United States Patent [19]

Daigle

[11] Patent Number: 4,959,647
[45] Date of Patent: Sep. 25, 1990

[54] WIRELESS POWER CONTROLLER FOR A MACHINE DEVICE

[75] Inventor: Joseph Daigle, Mission Hills, Calif.

[73] Assignee: Alternative Industrial Devices for Safety, Inc., Suffield, Conn.

[21] Appl. No.: 489,859

[22] Filed: Mar. 5, 1990

Related U.S. Application Data

[63] Continuation of Ser. No. 201,043, May 31, 1988, abandoned.

[51] Int. Cl.5 .............................................. H04Q 7/02
[52] U.S. Cl. ........................ 340/825.720; 340/825.73; 361/192; 361/191
[58] Field of Search ...................... 340/825.66, 825.69, 340/825.72, 825.73, 825.76; 341/176; 361/189, 191, 192, 193, 199; 307/117; 358/194.1; 455/603

[56] References Cited

U.S. PATENT DOCUMENTS

| | | | |
|---|---|---|---|
| 3,424,919 | 1/1969 | Howlett | 361/192 |
| 3,737,570 | 5/1973 | Fiorentino | 340/825.76 |
| 3,906,369 | 9/1975 | Pitman et al. | 340/825.72 |
| 4,104,592 | 8/1978 | Rätz et al. | 340/825.76 |
| 4,200,862 | 4/1980 | Campbell et al. | 340/825.62 |
| 4,507,702 | 3/1985 | Grewe | 307/117 |
| 4,641,292 | 2/1987 | Tunnell et al. | 367/198 |

Primary Examiner—Donald J. Yusko
Assistant Examiner—Eric O. Pudpud
Attorney, Agent, or Firm—McCormick Paulding & Huber

[57] ABSTRACT

A wireless power controller for use with a machine device to selectively connect and disconnect a machine device power source from the machine device includes a transmitter for transmitting an energy wave toward a receiving unit located at the machine device. The receiving unit has an electric switching circuit which is wired in series with the machine device power source and the machine device and provides electrical continuity through normally open transfer contacts are connected one-for-one with the voltage lines carrying power between the power source and the machine device and which contacts are closed during normal operation. The receiving unit senses an energy wave and causes the relay to become energized through operation of the switching circuit to disconnect power from the machine device.

1 Claim, 1 Drawing Sheet

WIRELESS POWER CONTROLLER FOR A MACHINE DEVICE

This is a continuation of co-pending application Ser. No. 07/201,043 filed on May 31, 1988, now abandoned.

BACKGROUND OF THE INVENTION

The present invention relates generally to safety apparatus for use with a machine device and deals more specifically with a wireless power controller for use with a machine device to selectively connect and disconnect the machine device power source from a location remote from the machine device.

Power is normally connected and disconnected from a machine device through a power ON/OFF safety switch which switch when actuated or operated after an initial start-up of the machine device disconnects the power source from the machine device until the ON/OFF power switch is reset. Typically, the ON/OFF power switch is located at a panel on the machine and may not be accessible by a machine operator using the machine device. It would be desirable therefore to allow supervisory personnel to monitor the operation of a machine device to insure the safety of an operator should the machine device malfunction or present some imminent danger to the operator, and in response to such an observation, cause power to be disconnected from the machine device to immediately stop its operation and remove the threat of harm to the operator.

It is an object of the present invention therefore to provide a wireless power controller that may be operated remotely from the machine device location to disconnect power and cause the machine device to shut down.

It is another object of the present invention to provide a wireless power controller that selectively disconnects power from a number of different machine devices.

SUMMARY OF THE INVENTION

In accordance with the present invention, a wireless power controller for use with a machine device to selectively connect and disconnect the machine device power source from a location remote from the machine device is presented. A transmitter device is used to transmit an energy wave of a given frequency toward a receiving circuit device located at the machine device. The receiving device cooperates with an electrical switching circuit which is electrically connected in series with the machine device power source. Typically, power is connected by a number of voltage power lines to an ON/OFF power switch of the machine device. The receiving circuit provides a relay contact closure upon sensing and detecting a transmitted energy wave and which closure provides power to the energizing coil of a first relay which has a normally closed transfer contact causing that contact to open. The normally closed transfer contact is electrically in series with the energizing coil of a second relay which has a number of normally open transfer contacts each of which are electrically and physically in series with a voltage power line connected to the machine device. In normal operation, the normally closed transfer contact of the first relay provides voltage to the energizing coil of the second relay causing the second relay to operate and to close its normally open contacts thereby providing a continuous electrical path from the power source to the machine device. Upon receipt of a transmitted signal by the receive circuit device, a contact closure provides voltage to the energizing coil of the first relay causing its normally closed contact to open to remove power from the energizing coil of the second relay. Upon removal of power from the energizing coil of the second relay, the normally open contacts associated with the second relay which were previously closed now open thus disconnecting the power source from the machine device.

The invention further resides in the transmitter having circuit means for encoding and selectively activating one of a different number of receiving circuits each of the different receiving circuits being associated with a different machine device. Thus supervisory personnel may monitor and insure the safety of operators of a number of different machine devices.

BRIEF DESCRIPTION OF THE DRAWINGS

Other objects, features and advantages of the present invention will be readily apparent from the following description and the accompanying drawings wherein.

DETAILED DESCRIPTION OF THE PREFERRED EMBODIMENTS

Figure 1:
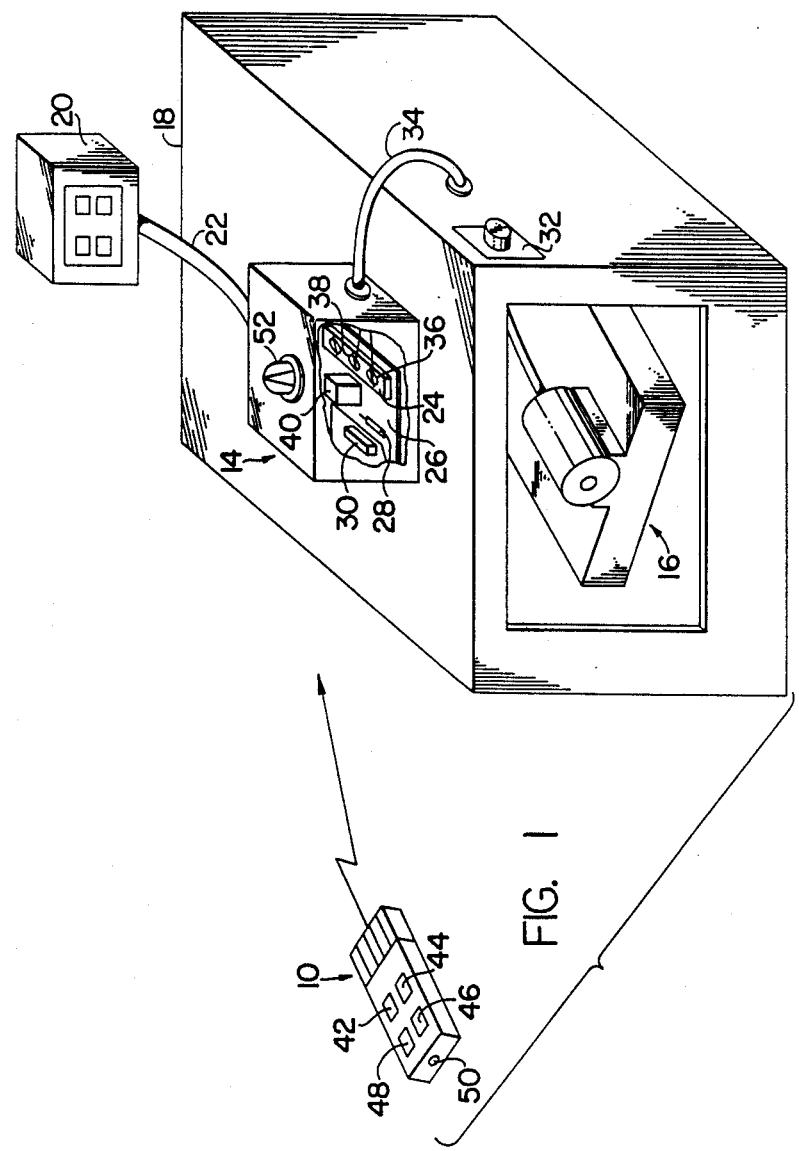
FIG. 1 is a somewhat schematic, perspective view of the transmitter and receiving circuit units embodying the present invention wherein the receiving circuit is shown mounted to a machine device.

Turning now to the drawings and considering FIG. 1, the transmitter unit 10 and the receiving circuit unit 14 comprising the wireless power controller of the present invention are shown therein. The receiving circuit unit 14 is shown arranged with a machine device schematically illustrated 16 within an enclosure 18. Power is supplied to the machine device 16 from a power source generally designated 20 via a power conduit 22 which conduit includes one or more voltage power lines dependent upon the electrical power requirements of the machine device. The voltage power lines are electrically and physically coupled to the receiving circuit unit 14 by way of a terminal strip 24 arranged on a circuit board 26 which contains the various electrical components 28 comprising the receiving circuit.

Power is connected to the machine device 16 via a power ON/OFF switch 32 via a power conduit 34 which is connected to terminals 36, 38 on the terminal strip 24. The electrical connection to the machine device power ON/OFF switch 32 is done in a manner well known to those skilled in the art and for purposes of this disclosure, the power ON/OFF switch is of the safety type requiring a manual reset once actuated after an initial start-up of the machine device. Power carried by the voltage lines 36,38 in the power conduit 34 is provided to the machine device through one or more transfer contacts within a relay 40.

A given frequency is transmitted from the transmitter 10 upon operation of one of a number of switches 42,44, 46,48, each of which switches causes a different frequency to be generated and transmitted by the transmit unit 10. A decoding circuit 30 in the receiving unit 14 is utilized to select one of a number of predetermined frequencies to which the receiving unit will respond and which frequencies correspond to one of the frequencies transmitted by the transmitter unit 10. Accordingly, the transmitter 10 may be used to operate, in the illustrated embodiment, four receiving units each of which respond to a different frequency.

The transmitter unit 10 also includes an indicator 50 which illuminates to indicate that the transmitter unit is being operated. Upon receipt of a transmitted signal by the receiving unit 14, a lamp 52 associated with the receiving unit lights to indicate that the receiving unit is operating. The receiving unit 14 will continue to operate for the duration of the time interval that the transmitter 10 is activated. Upon deactivation of the transmitter 10, the receiving unit 14 returns to its normal state and power is again provided to the machine device via the power conduit 34. However, since the power ON/OFF switch 32 associated with the machine device 16 is of the type that requires a manual reset once power is removed from the machine device, the machine device will not restart until a proper sequence is carried out.

Figure 2:
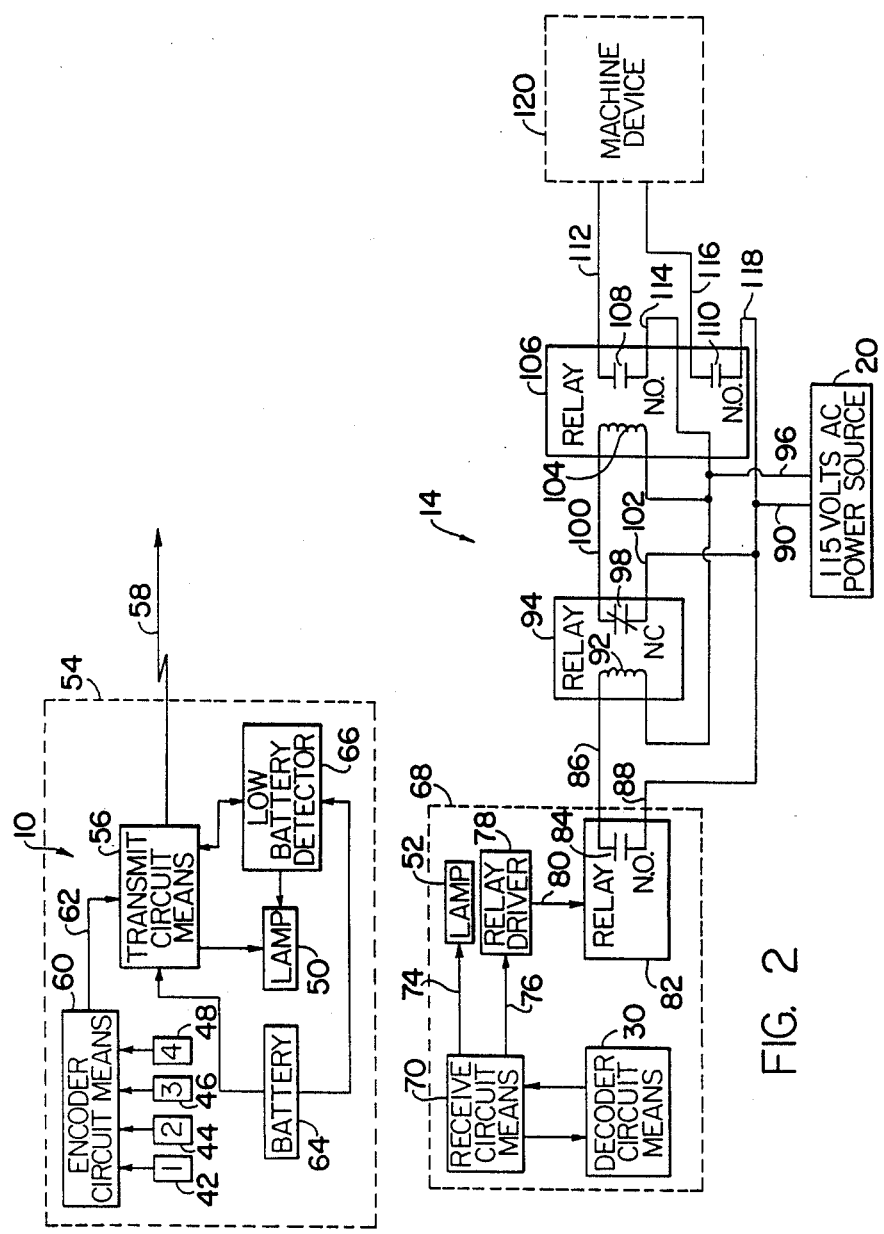
FIG. 2 is a somewhat schematic, functional block diagram illustrating the major functional components of the present invention.

Turning now to FIG. 2, the functional components of the transmitter 10 are shown within the dashed line box 54. A transmit circuit means 56 generates and transmits an energy wave generally designated 58 which energy wave has a frequency in accordance with a frequency determined by an encoder circuit means 60. The encoder circuit 60 is responsive to a signal generated by one of the activating switches 42, 44, 46, 48 which signal cause the encoder circuit to provide an output signal on lead 62 to activate the transmitter circuit means 56 to generate an energy wave having the desired frequency. Power is provided to the transmit unit 10 by a battery 64 which is monitored by a low battery detector 66. The indicator lamp 50 will not operate when the voltage potential of the battery 64 drops below a predetermined threshold as detected by the low battery detector 66. However, the circuitry of the transmitter 10 is designed to operate at a voltage potential less than the threshold voltage which is set by the low battery detector 66 to insure operation of the transmitter unit while alerting an operator that the battery 64 requires replacement.

The receiving unit 14 is shown functionally within the dashed line box 68 and includes a receive circuit means 70 which is sensitive to the energy beam 58 transmitted from the transmitter unit 10. The receive circuit 70 senses and detects a transmitted energy beam 58 when the frequency of the energy beam falls within a range set by a decoder circuit means 30. The decoder circuit 30 is set to cause the receive circuit 70 to be sensitive to and responsive to the sensed energy beam corresponding to the preset frequency. Upon receiving a transmitted signal within the proper frequency range, the receive circuit 70 provides an output signal on lead 74 which causes the lamp 52 to light indicating the operation of the receive circuit. The receive circuit 70 also provides a voltage signal at the lead 76 which operates a relay driver circuit 78 causing the driver circuit to provide an output voltage at lead 80 which energizes a relay 82. The relay 82 has a normally open transfer contact 84 which provides a contact closure when the relay 82 is operated to provide electric continuity at the output terminals of leads 86, 88. One lead 88 is connected to one of the voltage power lines 90 of the power source 20. The other output lead 86 is connected to one side of an energizing coil 92 of a relay 94 and the opposite side of the energizing coil 92 is connected to another voltage line 96 of the power source 20. Upon closure of the normally open transfer contact 84, the relay 94 operates causing its normally closed transfer contact 98 to open which removes electrical continuity between the terminals of its output leads 100 and 102, respectively. One side 100 of the normally closed transfer contact 98 is connected to one side of the energizing coil 104 of relay 106. The opposite side of the energizing coil 104 is connected to one side 96 of the power source 20. Therefore, when relay 94 is operated the normally closed transfer contact 98 opens and to a open power is removed from the energizing coil 104 of relay 106. The normally open transfer contacts 108, 110, respectively which contacts, previously due to the energization of the coil 104, provided a contact closure now return to a contact open condition. The output leads 112, 114 associated with the normally open transfer contact 108 of relay 106 are no longer electrically continuous. Likewise, the output leads 116 and 118 associated with the normally open contact 110 of relay 106 no longer have electrical continuity. As illustrated in FIG. 2, one side 90 of the power source 20 is connected to the lead 118 of the normally open transfer contact 110 and the other voltage line 96 of the power source 20 is connected to one lead 114 of the normally open transfer contact 108. In a normal operating condition, relay 106 is operated causing the normally open transfer contacts 108 and 110 to provide contact closures thus providing electrical continuity from the power source 20 to the machine device shown within the dashed line box 120.

From the foregoing, it is seen that the transmission of an energy wave 58 from the transmitter 10 is sensed by the receive circuit 70 of the receiving unit 14 which causes the relay 82 to close contact 84 which in turn operates the relay 94 causing its normally closed contact 98 to open. The opening of contact 98 removes voltage from the energizing coil 104 of relay 106 causing the contact closures provided by the normally open contacts 108 and 110 to become open thus disconnecting power from the leads 112 and 116, respectively.

A wireless, power controller for use with a machine device to selectively connect and disconnect a machine device power source from the machine device from a location remote from the machine device is presented above in several preferred embodiments. It will be understood that numerous changes and modifications may be made by those skilled in the art without departing from the spirit and scope of the invention. Therefore, the present invention has been presented by way of illustration rather than limitation.

I claim:

1. A wireless power controller apparatus for use with a machine device capable of presenting some imminent danger to an operator, said controller apparatus selectively connecting and disconnecting power from the machine device in response to instructions inputted to it by a person recognizing the imminent danger to the operator of the machine, said apparatus comprising:

transmitter circuit means for transmitting an energy wave having at least one predetermined frequency, said transmitter circuit having means for generating said energy wave at said at least one predetermined frequency and means for selecting said generated energy wave whereby said selected energy wave is transmitted by said transmitter circuit means;

receiving circuit means sensitive to said at least one predetermined frequency for sensing and detecting an energy wave transmitted from said transmitter circuit means, said receiving circuit means being located at the machine device;

electrical switching circuit means connected in series with a power source supplying power to the machine device and a power ON/OFF switch associated with the machine device to selectively connect and disconnect the power source from the power ON/OFF switch, said electrical switching means being coupled to and responsive to said receiving circuit means for connecting and disconnecting the power in response to sensing the absence and presence, respectively of said at least one predetermined frequency;

said transmitter circuit means including encoder circuit means for generating a number of different predetermined frequency energy waves;

said receiving circuit means including decoding circuit means for selectively setting one of a number of different sensing frequencies, each of said number of different sensing frequencies corresponding to one of said number of different predetermined frequency energy waves transmitted by said transmitter circuit means;

said receiving circuit means further including a receiving relay having a normally open transfer contact, said receiving relay being operated to provide a contact closure upon the sensing and detecting of said at least one predetermined frequency, said normally open contact being electrically coupled to said electrical switching circuit means;

said electrical switching circuit means further including a first relay having a normally closed transfer contact, said first relay being coupled to said receiving circuit means and being energized upon the sensing and detecting of said at least one predetermined frequency to open said normally closed contact, and a second relay having at least one normally open transfer contact, said second relay having an energizing coil connected in series with said normally closed contact of said first relay and a voltage power source for energizing said second relay when said first relay is unenergized to cause said at least one normally open contact of said second relay to provide a contact closure, said at least one normally open transfer contact being electrically connected in series with an associated voltage power line from the machine device power source and an input to the ON/OFF power switch; and wherein said second relay includes one-four-one a normally open transfer contact in series with each voltage power line connecting the machine device power source to the ON/OFF power switch.

* * * * *